(12) United States Patent
DiPietro et al.

(10) Patent No.: US 9,323,669 B1
(45) Date of Patent: Apr. 26, 2016

(54) SYSTEM, APPARATUS, AND METHOD OF INITIALIZING CACHE

(71) Applicant: EMC Corporation, Hopkinton, MA (US)

(72) Inventors: Guido A. DiPietro, Sterling, MA (US); Michael J. Cooney, Mendon, MA (US); Gerald E. Cotter, Hopkinton, MA (US); Philip Derbeko, Modiin (IL)

(73) Assignee: EMC Corporation, Hopkinton, MA (US)

( * ) Notice: Subject to any disclaimer, the term of this patent is extended or adjusted under 35 U.S.C. 154(b) by 296 days.

(21) Appl. No.: 14/145,302

(22) Filed: Dec. 31, 2013

(51) Int. Cl.
*G06F 12/02* (2006.01)
*G06F 12/08* (2006.01)

(52) U.S. Cl.
CPC ........ *G06F 12/0802* (2013.01); *G06F 12/0246* (2013.01)

(58) Field of Classification Search
CPC .......................... G06F 12/0802; G06F 12/0246
USPC .................. 711/103, 112, 113, 114, 118, 156
See application file for complete search history.

(56) References Cited

U.S. PATENT DOCUMENTS

| | | | | |
|---|---|---|---|---|
| 5,930,507 A * | 7/1999 | Nakahira | ............... | G06F 8/4442 711/E12.017 |
| 7,424,577 B2 * | 9/2008 | Bali | .................... | G06F 12/0804 711/118 |
| 7,430,639 B1 * | 9/2008 | Bali | ....................... | G06F 12/126 711/118 |
| 8,176,251 B2 * | 5/2012 | Bali | .................... | G06F 12/0804 711/118 |
| 8,255,630 B1 * | 8/2012 | Bali | .................... | G06F 12/0897 711/118 |
| 8,375,190 B2 * | 2/2013 | Hamilton | ................ | G06F 3/061 711/156 |
| 9,043,535 B1 * | 5/2015 | Derbeko | ............... | G06F 3/0631 711/103 |
| 9,116,811 B1 * | 8/2015 | Derbeko | ............. | G06F 11/2056 |
| 2007/0050548 A1 * | 3/2007 | Bali | ..................... | G06F 12/0804 711/118 |
| 2008/0177975 A1 * | 7/2008 | Kawamura | ........ | G06F 17/30339 711/173 |
| 2008/0294846 A1 * | 11/2008 | Bali | .................... | G06F 12/0804 711/118 |
| 2010/0318492 A1 * | 12/2010 | Utsugi | .............. | G06F 17/30286 707/603 |
| 2011/0029728 A1 * | 2/2011 | Popovski | .............. | G06F 3/0611 711/114 |
| 2013/0238620 A1 * | 9/2013 | Konno | .............. | G06F 17/30946 707/736 |

* cited by examiner

*Primary Examiner* — Stephen Elmore
(74) *Attorney, Agent, or Firm* — Krishnendu Gupta; Konrad R. Lee (57) ABSTRACT

A computer-executable method, system, and computer program product for managing a data storage system, wherein the data storage system includes a cache and a data storage array, the computer-executable method, system, and computer program product comprising receiving initialization information, analyzing the initialization information to determine which portions of the data storage array related to the initialization information, and managing the data storage system based on the determined portion of the data storage array.

15 Claims, 8 Drawing Sheets

SYSTEM, APPARATUS, AND METHOD OF INITIALIZING CACHE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for managing a data storage system, wherein the data storage system includes a cache and a data storage array, the computer-executable method, system, and computer program product comprising receiving initialization information, analyzing the initialization information to determine which portions of the data storage array related to the initialization information, and managing the data storage system based on the determined portion of the data storage array.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Typically, data storage systems are relied upon to provide high performance data storage solutions. Traditionally, high performance solutions mean that a data storage system is fast, reliable, and efficient in their use of data storage resources. Generally, performance of a data storage system is affected by where, within the data storage system, data is stored. Conventionally, being able to improve the performance of data storage systems may be beneficial to the data storage industry.

Traditionally, data storage systems warm cache to improve performance of the data storage system. Generally, warming cache involves a data storage system determining which portions of data to cache based on an application's I/O requests for the data. Typically, warming cache within a data storage system takes a long time as a data storage system manages data in response to I/O requests.

In many embodiments, the current disclosure may enable improved performance of data storage systems by preloading cache. In various embodiments, preloading cache may include providing a given logical address range of a given source device. In certain embodiments, preloading cache may include providing a location of data on a data storage array which may be predetermined to be anticipated "hot" data for a given application.

In many embodiments, the current disclosure may enable creation of a data management module for a data storage system. In various embodiments, a data management module may be enabled to manage use of cache within a data storage system. In certain embodiments, a data management module may enable users and/or administrators to prepare a data storage system to run a specified application. In some embodiments, a data management module may enable an application to run an initialization process to warm cache of a data storage system.

For example, in many embodiments, a data storage system may execute periodic applications, such a payroll application. In various embodiments, a user and/or administrator may be enabled to use a data management module to predict data storage usage based on previous application usage. In certain embodiments, a user and/or administrator may be enabled to use the data management module to pre-load data stored within the data storage array to cache to improve performance of the data storage array. In many embodiments, a data set needed for an application may be well known by the administrator. In various embodiments, a data management module may enable an administrator to pre-load a data set to cache to enable an application to run much faster and more efficiently.

Figure 1:
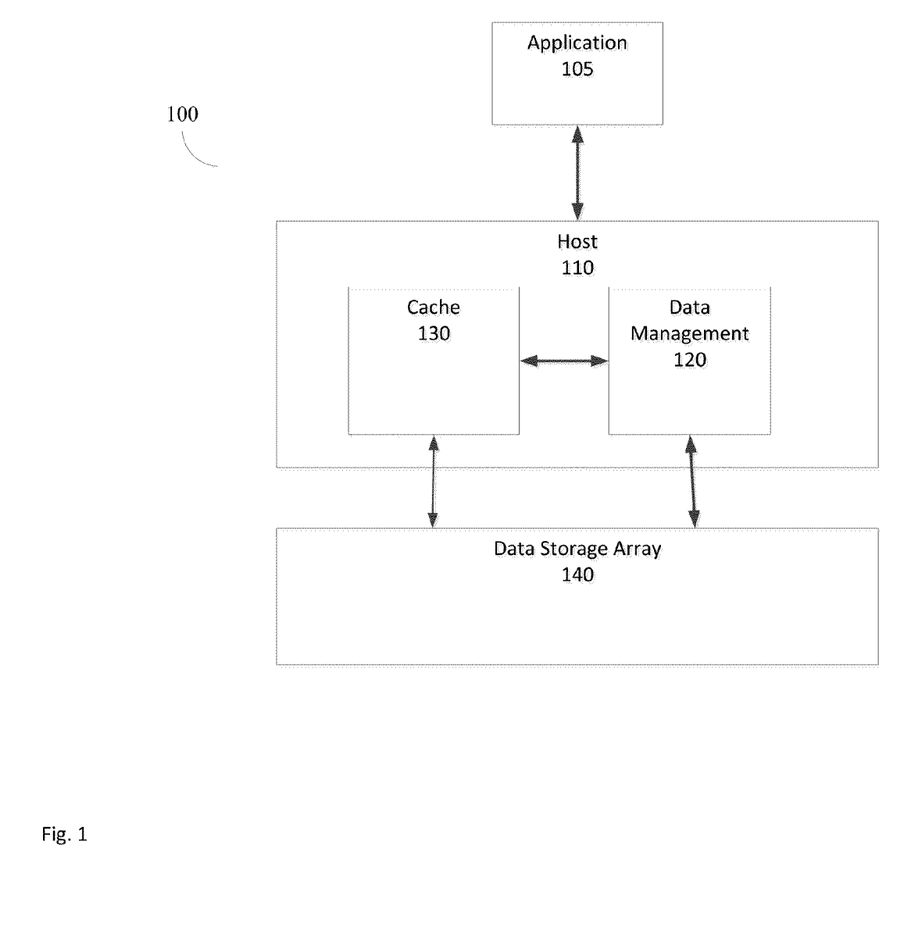
FIG. 1 is a simplified illustration of a data storage system, in accordance with the present disclosure.

Refer to the example embodiment of FIG. 1. FIG. 1 is a simplified illustration of a data storage system, in accordance with the present disclosure. Data storage system 100 includes host 110 and data storage array 140. As shown, host 110 includes data management module 120 and cache 130. In this embodiment, data management module 120 is enabled to manage data stored on data storage system 100. Application 105 is enabled to store data on data storage system 100 in data storage array 140. As shown, data management module 120 is enabled to cache data on cache 130 to enable faster access of data by application 105. In many embodiments, cache may be flash cache.

Figure 2:
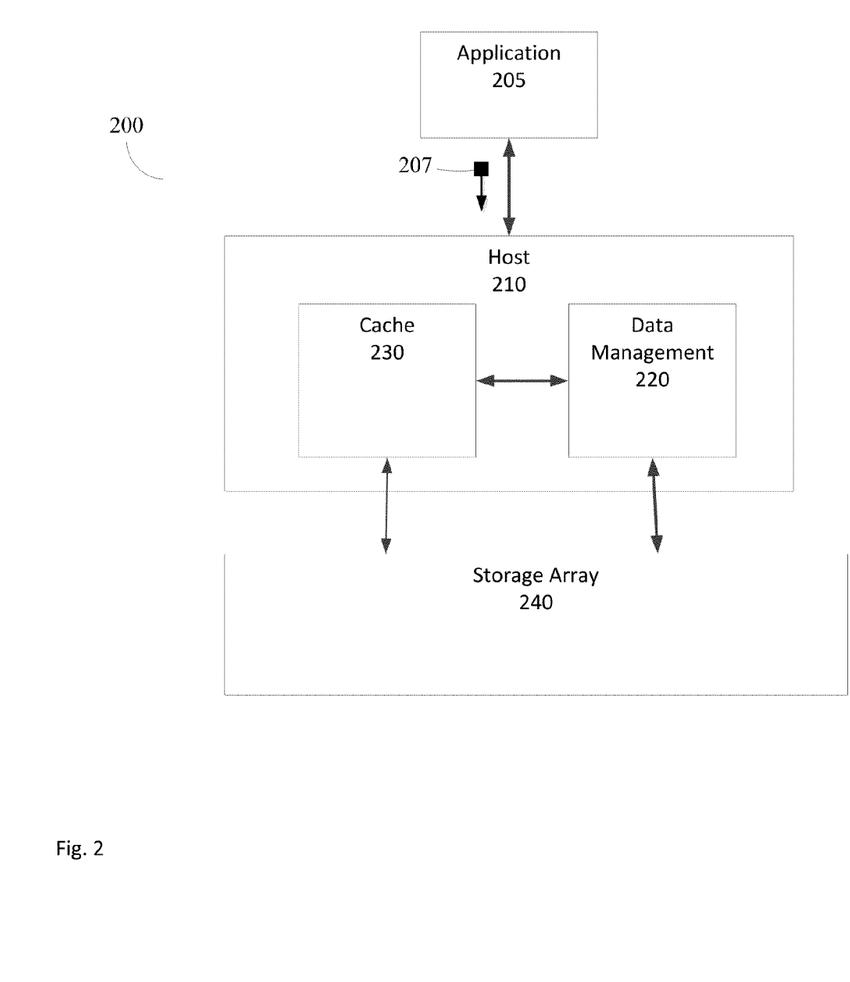
FIG. 2 is a simplified illustration of a data storage system being initialized, in accordance with the present disclosure.

Refer to the example embodiment of FIG. 2. FIG. 2 is a simplified illustration of a data storage system being initialized, in accordance with the present disclosure. As shown, data storage system 200 includes Host 210 and data storage array 240. Host 210 includes data management module 220 and cache 230. In this embodiment, application 205 initializes data storage system 200 using message 207. As shown, message 207 includes references to portions of data storage array 240 that application 205 utilizes while executing.

Figure 3:
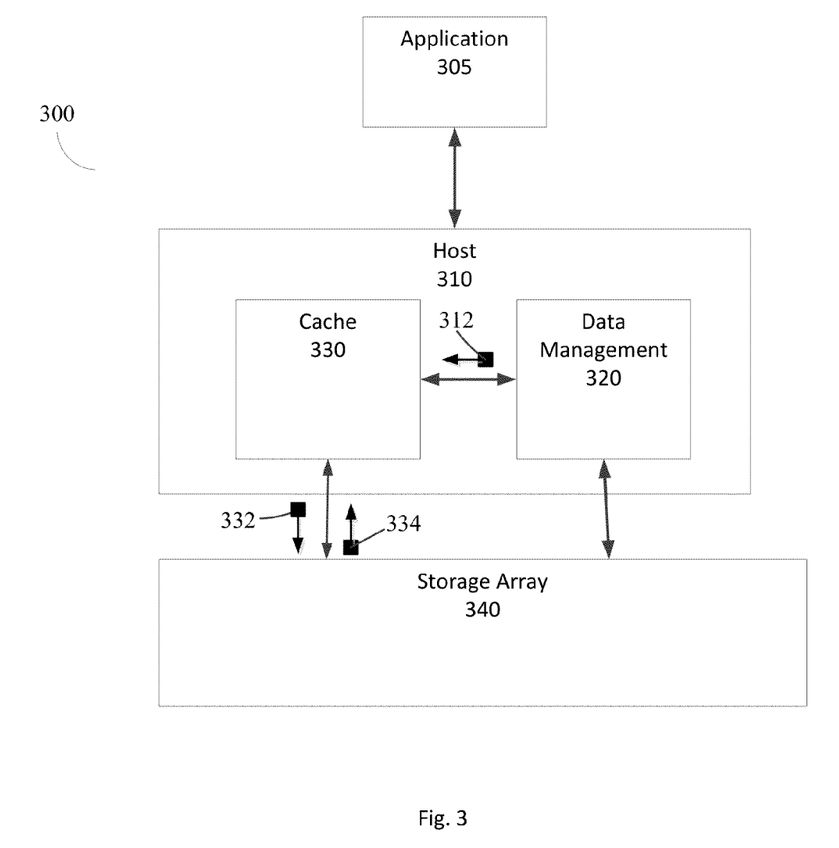
FIG. 3 is an alternative simplified illustration of a data storage system pre-loading data, in accordance with an embodiment of the present disclosure.

Refer to the example embodiment of FIG. 3. FIG. 3 is an alternative simplified illustration of a data storage system pre-loading data, in accordance with an embodiment of the present disclosure. As shown, data storage system 300 includes Host 310 and data storage array 340. Host 310 includes data management module 320 and cache 330. In this embodiment, data management module 320 has been initialized by application 305.

Data management module 320 directs cache 330 to pre-load data from data storage array 340 using message 312. Cache 330 requests data from data storage array 340 using message 332. Data storage array 340 responds to data request in message 334 and cache 330 caches data included in message 334.

Figure 4:
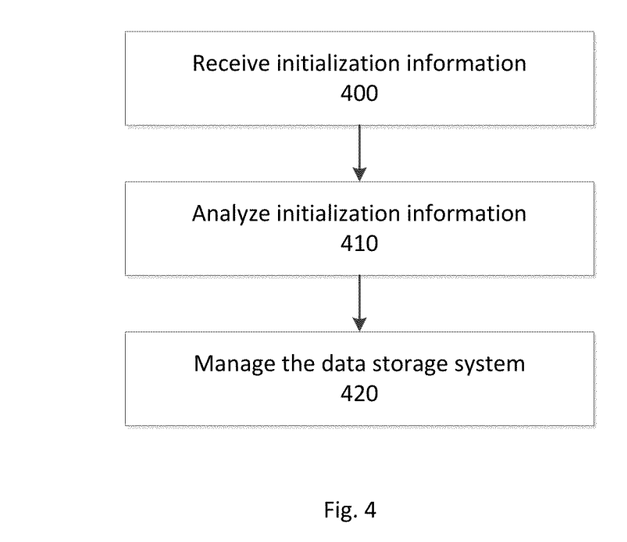
FIG. 4 is a simplified flowchart of a method of managing a data storage system, in accordance with an embodiment of the present disclosure.

Refer to the example embodiment of FIGS. 2 and 4. FIG. 4 is a simplified flowchart of a method of managing a data storage system, in accordance with an embodiment of the present disclosure. As shown, data storage system 200 includes Host 210 and data storage array 240. In this embodiment, application 205 sends initialization information (Step 400) to data storage system 200 using message 207. In many embodiments, initialization information may include which portions of a data storage array may be used by a given application. In various embodiments, initialization information may specify one or more locations within a data storage array that may be cached by the data management module during initialization. In some embodiments, initialization information may be sent to a data storage system by a user and/or administrator. In other embodiments, initialization information may be sent to a data storage system as part of messages from an application during initialization of the application.

As shown, data management module 220 analyzes initialization the initialization information (Step 410) to determine an optimized and/or efficient configuration for storing data on the data storage system. Data management module 220 manages data stored on data storage system 200 based on the analysis (Step 420). Data management module 220 caches portions of data stored on data storage array 240 to cache 230.

Figure 5:
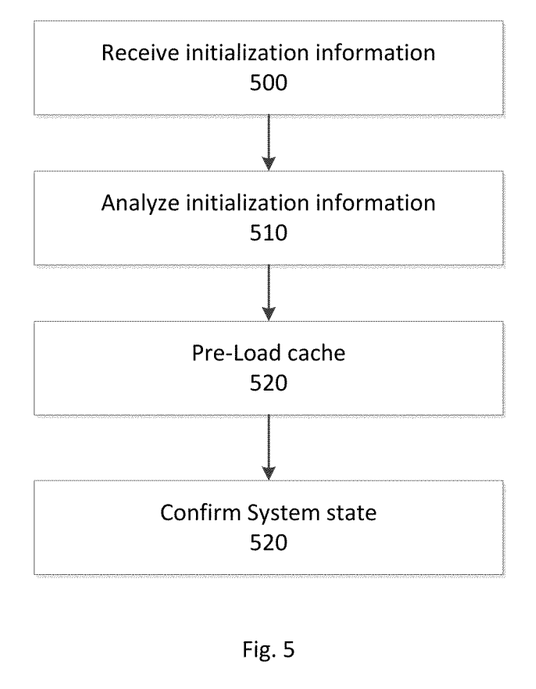
FIG. 5 is an alternative simplified flowchart of a method of managing a data storage system, in accordance with an embodiment of the present disclosure.

Refer to the example embodiments of FIGS. 3 and 5. FIG. 5 is an alternative simplified flowchart of a method of managing a data storage system, in accordance with an embodiment of the present disclosure. As shown, data storage system 300 includes host 310 and data storage array 340. Host 310 includes data management module 320 and cache 330. In this embodiment, data storage system 300 receives initialization information from application 305 (Step 500). Data storage system 300 utilizes data management module 320 to analyze the received initialization information (Step 510). Data management module 320 determines which portions of data storage array 340 to place into cache 330. Data management module 320 pre-loads cache 330 using message 312 (Step 520). Cache 330 requests data from data storage array 340 using message 332. Data storage Array 340 sends requested data using message 334. In this embodiment, once portions of data storage array 340 are cached in cache 330, data management 320 confirms to application 305 that data storage system 300 is ready for processing (Step 520).

Figure 6:
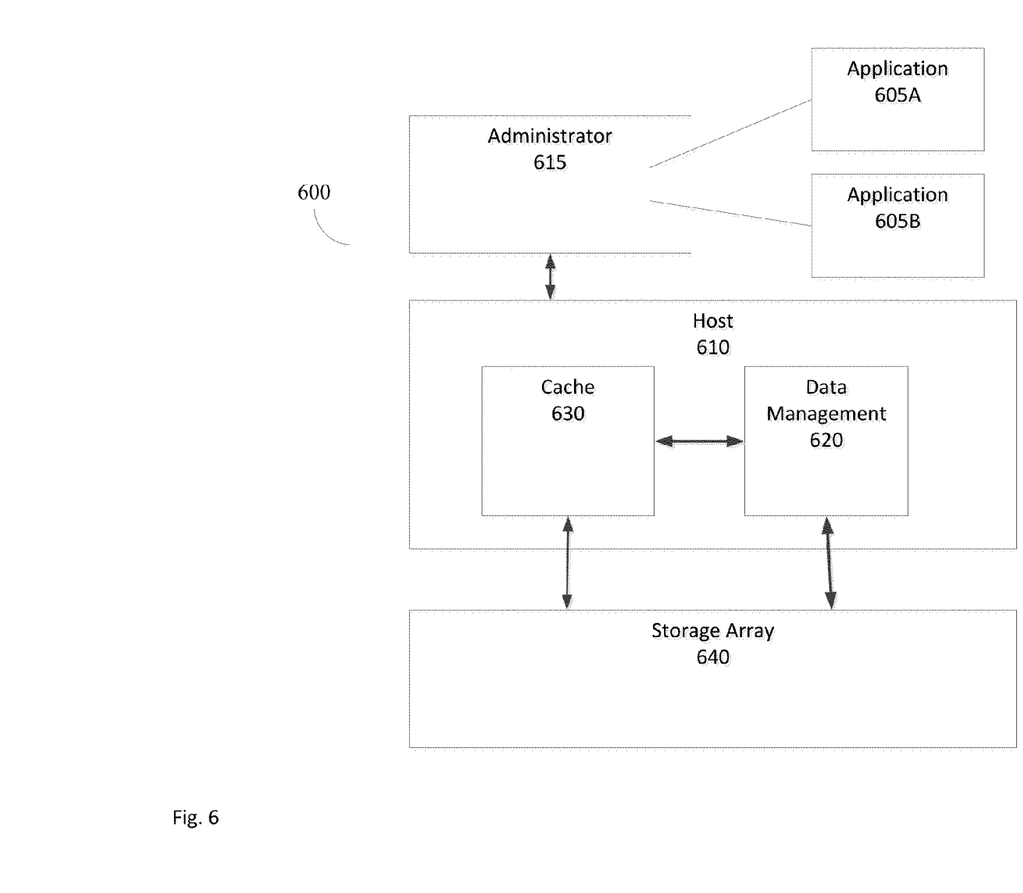
FIG. 6 is a further alternate embodiment of a data storage system, in accordance with an embodiment of the present disclosure.

Refer to the example embodiment of FIG. 6. FIG. 6 is a further alternate embodiment of a data storage system, in accordance with an embodiment of the present disclosure. In this embodiment, data storage system 600 includes host 610 and data storage array 640. As shown, administrator 615 is enabled to manage applications 605A, 605B. Administrator 615 is enabled to initialize data storage system 600 to process both application 605A and 605B. In this embodiment, Administrator 615 initializes data storage system 600 to pre-load portions of data stored on data storage array 640 to cache 630, wherein the pre-loaded portions of data relate to applications 605A, 605B. In many embodiments, an administrator may be enabled to prepare a data storage system to run one or more applications simultaneously and/or in series.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 7:
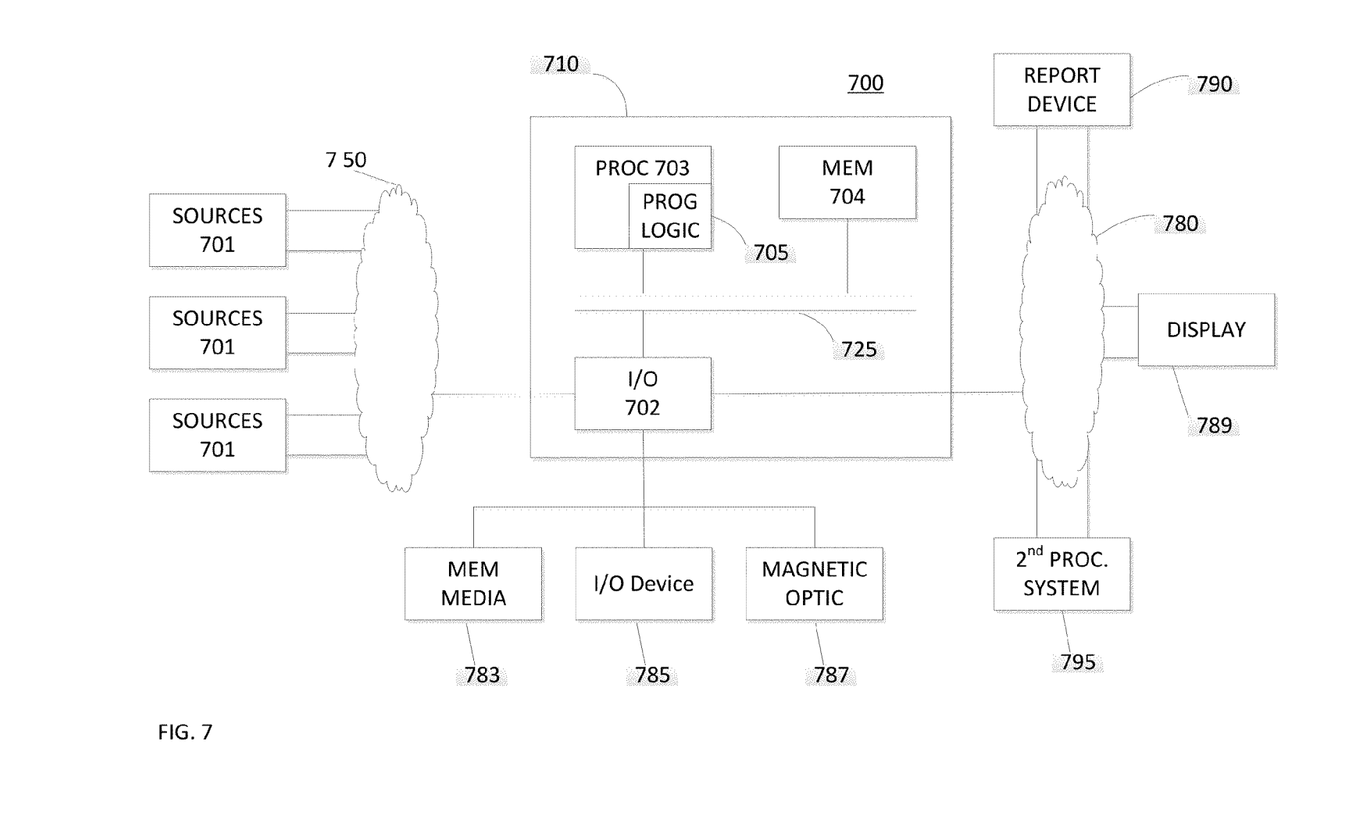
FIG. 7 is an example of an embodiment of an apparatus that may utilize the techniques described herein, in accordance with an embodiment of the present disclosure.

FIG. 7 is a block diagram illustrating an apparatus, such as a computer 710 in a network 700, which may utilize the techniques described herein according to an example embodiment of the present invention. The computer 710 may include one or more I/O ports 702, a processor 703, and memory 704, all of which may be connected by an interconnect 725, such as a bus. Processor 703 may include program logic 705. The I/O port 702 may provide connectivity to memory media 783, I/O devices 785, and drives 787, such as magnetic or optical drives. When the program code is loaded into memory 704 and executed by the computer 710, the machine becomes an apparatus for practicing the invention. When implemented on one or more general-purpose processors 703, the program code combines with such a processor to provide a unique apparatus that operates analogously to specific logic circuits. As such, a general purpose digital machine can be transformed into a special purpose digital machine.

Figure 8:
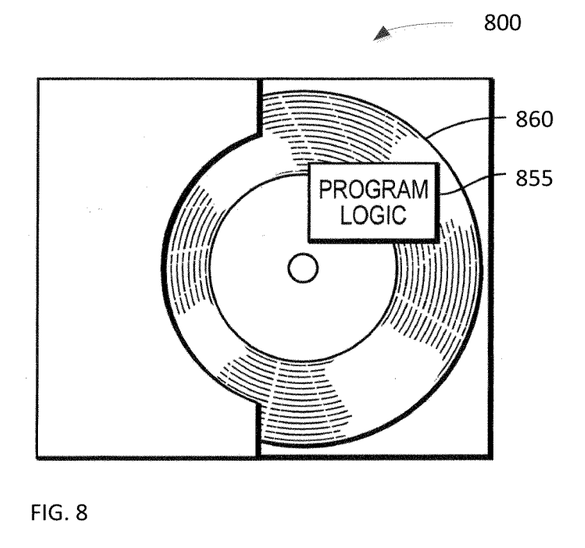
FIG. 8 is an example of a method embodied on a computer readable storage medium that may utilize the techniques described herein, in accordance with an embodiment of the present disclosure.

FIG. 8 is a block diagram illustrating a method embodied on a computer readable storage medium 860 that may utilize the techniques described herein according to an example embodiment of the present invention. FIG. 8 shows Program Logic 855 embodied on a computer-readable medium 860 as shown, and wherein the Logic is encoded in computer-executable code configured for carrying out the methods of this invention and thereby forming a Computer Program Product 800. Program Logic 855 may be the same logic 705 on memory 704 loaded on processor 703 in FIG. 7. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing a data storage system, wherein the data storage system includes a cache and a data storage array, the computer-executable method comprising:
   receiving initialization information;
   analyzing the initialization information to determine which portions of the data storage array related to the initialization information; and
   managing the data storage system based on the determined portion of the data storage array.

2. The computer-executable method of claim 1, wherein the cache is flash cache.

3. The computer-executable method of claim 1, wherein the initialization information relates to an application using the data storage system.

4. The computer-executable method of claim 1, wherein the initialization information includes which portions of the data storage array to be cached in the cache.

5. The computer-executable method of claim 1, wherein the managing comprises:
   allocating storage on the cache for the determined portion of the data storage array; and
   updating the cache with the determined portion of the data storage array.

6. A system, comprising:
   a data storage system including a cache and a data storage array; and
   computer-executable logic encoded in memory of one or more computers in communication with the data storage system to manage the cache, wherein the computer-executable program logic is configured for the execution of:
   receiving initialization information;
   analyzing the initialization information to determine which portions of the data storage array related to the initialization information; and
   managing the data storage system based on the determined portion of the data storage array.

7. The system of claim 6, wherein the cache is flash cache.

8. The system of claim 6, wherein the initialization information relates to an application using the data storage system.

9. The system of claim 6, wherein the initialization information includes which portions of the data storage array to be cached in the cache.

10. The system of claim 6, wherein the computer-executable program logic is further configured for the execution of:
    wherein the managing comprises:
    allocating storage on the cache for the determined portion of the data storage array; and
    updating the cache with the determined portion of the data storage array.

11. A computer program product for managing a data storage system, wherein the data storage system includes a cache and a data storage array, the computer program product comprising:
    a non-transitory computer readable medium encoded with computer-executable program code for using read signatures in replication, the code configured to enable the execution of:
    receiving initialization information;
    analyzing the initialization information to determine which portions of the data storage array related to the initialization information; and
    managing the data storage system based on the determined portion of the data storage array.

12. The computer program product of claim 11, wherein the cache is flash cache.

13. The computer program product of claim 11, wherein the initialization information relates to an application using the data storage system.

14. The computer program product of claim 11, wherein the initialization information includes which portions of the data storage array to be cached in the cache.

15. The computer program product of claim 11, wherein the code is further configured to enable the execution of:
    wherein the managing comprises:
    allocating storage on the cache for the determined portion of the data storage array; and
    updating the cache with the determined portion of the data storage array.

* * * * *